United States Patent
Lucidarme et al.

(10) Patent No.: US 12,218,621 B2
(45) Date of Patent: Feb. 4, 2025

(54) METHOD AND SYSTEM FOR GENERATING ELECTRICAL ENERGY COMPRISING A COLLECTING ROBOT AND A PLURALITY OF PRODUCING ROBOTS

(71) Applicant: ELECTRICITE DE FRANCE, Paris (FR)

(72) Inventors: Thierry Lucidarme, Palaiseau (FR); Mike Van Iseghem, Thomery (FR); Anne-Sophie Coince, Palaiseau (FR); Jean-Marc Lauruol, Palaiseau (FR); Bernadette Elliott-Bowman, Leatherhead (GB); Harry Michael Cronin, Cambridge (GB); Phil Peter Catton, Cambridge (GB); Laura Kristine Bujouves, Lausanne (CH)

(73) Assignee: ELECTRICITE DE FRANCE, Paris (FR)

( * ) Notice: Subject to any disclaimer, the term of this patent is extended or adjusted under 35 U.S.C. 154(b) by 449 days.

(21) Appl. No.: 17/546,771

(22) Filed: Dec. 9, 2021

(65) Prior Publication Data
US 2022/0190772 A1  Jun. 16, 2022

(30) Foreign Application Priority Data

Dec. 11, 2020 (EP) .................................... 20306549

(51) Int. Cl.
*H02S 10/40* (2014.01)
*G05D 1/00* (2024.01)
*H02J 50/00* (2016.01)

(52) U.S. Cl.
CPC ........... *H02S 10/40* (2014.12); *G05D 1/0225* (2013.01); *G05D 1/0291* (2013.01); *G05D 1/12* (2013.01); *H02J 50/00* (2016.02)

(58) Field of Classification Search
CPC ................ H02S 10/40; G05B 19/4155; G06Q 10/08355
See application file for complete search history.

(56) References Cited

U.S. PATENT DOCUMENTS

| | | | |
|---|---|---|---|
| 2015/0073594 A1* | 3/2015 | Trujillo | B25J 9/162 901/1 |
| 2018/0208310 A1* | 7/2018 | Boyk | H02S 40/38 |

(Continued)

FOREIGN PATENT DOCUMENTS

CN  109911144 A  6/2019

OTHER PUBLICATIONS

European Search Report issued on May 14, 2021, in European Application No. 20306549.5; 7 pages.

(Continued)

*Primary Examiner* — Jaime Figueroa
*Assistant Examiner* — Jerrod Irvin Davis
(74) *Attorney, Agent, or Firm* — Maier & Maier, PLLC (57) ABSTRACT

A system for generating electrical energy, for instance at an agricultural site. The system includes at least one mobile robot, referred to as "collecting robot" and a plurality of mobile robots, referred to as "producing robots". Each collect robot includes at least one input port adapted for coupling with an output port of a producing robot and an output port for outputting electrical energy received from each producing robot coupled with the collecting robot. Each producing robot includes a photovoltaic generator, at least one input port adapted for coupling with an output port of another producing robot, and at least one output port for outputting electrical energy generated by the producing robot and received from each other producing robot coupled with the producing robot.

18 Claims, 4 Drawing Sheets

(56) References Cited

U.S. PATENT DOCUMENTS

2018/0311822 A1* 11/2018 Kaminka ............... B25J 9/1682
2019/0308514 A1    10/2019 Parimi et al.
2023/0105424 A1*  4/2023 Novak ...................... E02D 5/56
                                                                    307/26
2024/0006903 A1*  1/2024 Sharp ................ H02J 13/00002

OTHER PUBLICATIONS

Yanqiong, Fei et al., "Design of the solar-driven module on modular mobile robot", Mechatronics and Machine Vision in Practice (M2VIP) Nov. 28-30, 2012, 19th International Conference, IEEE, Nov. 28, 2012, pp. 470-473; XP032346637.

* cited by examiner

METHOD AND SYSTEM FOR GENERATING ELECTRICAL ENERGY COMPRISING A COLLECTING ROBOT AND A PLURALITY OF PRODUCING ROBOTS

FIELD

This disclosure relates to electrical energy generation and relates more specifically to a method and system for generating electrical energy that requires little or no infrastructure at a target electrical energy production site.

The present disclosure finds a particularly advantageous application, although in no way limiting, for producing electrical energy at agricultural sites.

BACKGROUND

In general, installing fixed photovoltaic, PV, panels on an agricultural land uses heavy machinery that causes soil compaction. This compaction can take years to repair and affects the viability of the soil for crop growing.

Also, once fixed PV panels are installed in a given area, the soil in that area can no longer be used for crop growing, or at least not for any type of crop if the crop is grown below the fixed PV panels. Hence, installing fixed PV panels may affect the available surface for crop growing.

Also, fixed PV panels produce electricity but only for equipment in the area where they are installed. In case of a (temporary) need for electrical energy in another area, new additional connecting installations are necessary.

SUMMARY

The present invention aims at improving the situation. In particular, the present invention aims at overcoming at least some of the limitations of the prior art discussed above, by proposing a solution enabling temporary and flexible installation of PV generation means in a target area.

According to a first aspect, the present disclosure relates to a system for generating electrical energy to be supplied to an equipment at a target area, for instance at an agricultural site, comprising:
- at least one mobile robot, referred to as "collecting robot";
- a plurality of mobile robots, referred to as "producing robots"; wherein each collecting robot comprises:
- at least one input port adapted for coupling with an output port of a producing robot, for receiving electrical energy thereof;
- an output port for outputting electrical energy received from each producing robot coupled with the collecting robot; wherein each producing robot comprises:
- a photovoltaic, PV, generator for generating electrical energy;
- at least one input port adapted for coupling with an output port of another producing robot, for receiving electrical energy thereof;
- at least one output port for outputting electrical energy generated by the producing robot and received from each other producing robot coupled with the producing robot;

wherein at least one collecting robot and a plurality of producing robots are coupled together at the target area and the output port of the at least one collecting robot is connected to the equipment, and the collecting robot is configured to collect electrical energy from all the producing robots it is coupled with and to supply the equipment with the collected electrical energy.

Hence, the system enables to build a PV installation composed by a plurality of mobile robots. These mobile robots may be e.g. autonomous or remotely controlled. Since these robots are mobile, so is the PV installation which may be temporarily installed only when needed in a target area, which may be moved from a target area to another one, etc.

The temporary PV installation may be obtained by coupling a plurality of mobile robots comprising at least one collecting robot and a plurality of producing robots. Such plurality of coupled mobile robots is referred to as "array" of coupled mobile robots. The mobile robots of the array are coupled once they have moved to the target area, said coupling enabling electrical energy transfer from one mobile robot to another. Each producing robot carries a PV generator and can produce electrical energy. The collecting robot, which may or may not be configured to produce electrical energy, is configured to collect electrical energy from all the producing robots it is coupled with, either directly or indirectly through another producing robot, and to supply the collected electrical energy to another equipment.

Hence, even though the PV installation comprises a plurality of mobile robots, the electrical energy produced by an array of coupled mobile robots may be retrieved at a single output port of the collecting robot.

The array may comprise an arbitrary number of producing robots, such that the temporary PV installation may be adapted by configuration to specific electrical power needs, by e.g. increasing the number of producing robots when the electrical power needs increase, etc.

Also, each collecting robot comprises preferably a plurality of input ports, and each producing robot comprises preferably a plurality of input ports and a plurality of output ports. Hence, for a given number of mobile robots, there are different possibilities for coupling them, resulting in different possible shapes for the array of coupled mobile robots. Hence, the shape of the array of coupled mobile robots may be adapted e.g. to the shape of the target area, etc.

Also, since the temporary PV installation comprises a plurality of mobile robots that are coupled once installed in the target area, any deteriorated PV generator of a producing robot may be simply replaced by uncoupling from the array the producing robot having a deteriorated PV generator, and by replacing it by another producing robot.

In specific embodiments, the system for generating electrical energy may further comprise one or more of the following features, considered either alone or in any technically possible combination.

In specific embodiments, each PV generator may comprise a flexible or rigid PV surface, and/or may comprise a foldable/un-foldable PV surface.

In specific embodiments, each input port and each output port of a producing robot is connected to PV cells of the PV generator of said producing robot, such that the PV cells of coupled producing robots form a macro PV generator grouping the PV generators of the coupled producing robots.

By forming a macro PV generator grouping the PV generators of the coupled producing robots, the electrical energy transfer losses from each producing robot to the collecting robot are minimized. Each PV generator corresponds then to a PV section of the macro PV generator, in which the PV sections may be arranged electrically in parallel and/or in series. Hence, in that case, the electrical energy generated by the macro PV generator is obtained directly at the collecting robot, or at one or more producing robots coupled directly with the collecting robot if e.g. said collecting robot does not include a PV generator connected to the macro PV generator.

In specific embodiments, the PV generator of a producing robot has a polygonal shape having at least three sides, and wherein at least one input port and at least one output port are located on different sides of the PV generator. Preferably, each side of the PV generator is provided with an input port and/or with an output port. The same shape is preferably used also for the collecting robot, in which case each side is preferably provided with an input port.

In specific embodiments, the PV generator of a producing robot has a triangular shape or a square shape or, preferably, a hexagonal shape. The same shape is preferably used also for the collecting robot.

Such provisions enable to have a dense array of coupled mobile robots, reducing electrical energy losses and maximizing the PV surface of the array of coupled mobile robots for a given projected footprint of the array of coupled mobile robots.

In specific embodiments, each producing robot comprises an electrical energy collector module configured to:
   collect the electrical energy generated locally by the electrical energy generating means and any electrical energy received on an input port;
   provide the electrical energy collected on the output port.

In that case, each producing robot collects locally the electrical energy generated by its own PV generator, and transfers the collected electrical energy to a coupled producing robot or collecting robot. In other words, the PV generators of the producing robots generate electrical energy independently one from another, unlike the case of a macro PV generator described above in which the electrical energy is generated collectively by the PV generators.

In specific embodiments, at least one input port and at least one output port of all or part of the producing robots is a wireless power transfer module.

In specific embodiments, at least one collecting robot and/or at least one producing robot is an unmanned terrestrial vehicle, UTV, and/or at least one collecting robot and/or at least one producing robot is an unmanned aerial vehicle, UAV. It is emphasized that the system may comprise only UTVs or may comprise only UAVs or may comprise any combination of UTVs and UAVs. For instance, in the latter case, each collecting robot may be an UTV while each producing robot may be an UAV, etc.

In specific embodiments, all or part of the UTVs have a main body having a bottom face that is positioned or that can be positioned at a height higher than or equal to 0.5 m, or higher than or equal to 1 m. Such a configuration of the UTVs provides for room below the UTVs, such that an area below the UTVs, for instance a crop growing area, may be protected from e.g. the sun. It is noted that the same provisions may also apply for UAVs if they are used for shadowing while on the ground.

In specific embodiments at least one collecting robot comprises electrical energy generating means.

In specific embodiments, at least one collecting robot is a tethered mobile robot in which the output port is located at an end of a cable. For instance, all or part of the collecting robots are tethered mobile robots, and all or part of the producing robots are untethered mobile robots.

In specific embodiments, at least one collecting robot and/or at least one producing robot comprises an electrical energy storage module.

In specific embodiments at least one mobile robot comprises means for modifying the inclination of a PV surface of a PV generator of said mobile robot with respect to a main body of said mobile robot.

In specific embodiments, the system for generating electrical energy further comprises an array controller configured to determine a configuration of an array of coupled mobile robots comprising at least one collecting robot and a plurality of producing robots.

According to a second aspect, the present disclosure relates to a method for generating electrical energy to be supplied to an equipment at a target area, for instance at an agricultural site, by using a system according to any one of the embodiments of the present disclosure, said method comprising:
   determining a configuration of an array of coupled mobile robots comprising at least one collecting robot and a plurality of producing robots, said array configuration defined by a number of mobile robots of the array, respective target positions and target orientations of the mobile robots of the array, and couplings to be established between input ports and output ports of the mobile robots of the array such that each producing robot is coupled directly or indirectly to the collecting robot;
   commanding the uncoupled mobile robots to move from their respective current positions to their respective target positions and target orientations of the array configuration;
   coupling the input ports and output ports of the mobile robots of the array according to the couplings defined in the array configuration;
   generating electrical energy by the array of coupled mobile robots, collecting by the collecting robot the generated electrical energy and outputting the collected electrical energy at the output port of the collecting robot connected to the equipment.

In specific embodiments, the method for generating electrical energy may further comprise one or more of the following features, considered either alone or in any technically possible combination.

In specific embodiments, determining the array configuration comprises determining an availability information for each mobile robot of the system and selecting the mobile robots of the array based on the availability information of each mobile robot.

In specific embodiments, the array configuration is determined based on a predetermined target level of electrical energy to be generated at the target area.

In specific embodiments, the array configuration is determined based on a configuration of the target area, said target area configuration comprising at least one of the following:
   position of the equipment to be connected to the output port of the collecting robot;
   information on size and/or a shape of the target area where the array of coupled mobile robots is to be stationed;
   weather information for the target area;
   scheduled time interval(s) during which the array of coupled mobile robots is to be formed.

According to a third aspect, the present disclosure relates to a method for generating electrical energy and for shadowing an area, comprising:
   during a first time interval: generating electrical energy, by a method according of any one of the embodiments of the present disclosure, by an array of coupled mobile robots;

during a second time interval: moving all or part of the mobile robots of the array above an area that is to be shaded.

According to a fourth aspect, the present disclosure relates to a computer program product comprising instructions which, when executed by at least one processor, configure said at least one processor to carry out at least the step of determining a configuration of an array of coupled mobile robots of a method according to any one of the embodiments of the present disclosure.

According to a fifth aspect, the present disclosure relates to a computer-readable storage medium comprising instructions which, when executed by at least one processor, configure said at least one processor to carry out at least the step of determining a configuration of an array of coupled mobile robots of a method according to any one of the embodiments of the present disclosure.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

DETAILED DESCRIPTION

The present disclosure relates to a system for generating electrical energy that may be used for instance at an agricultural site, or any site where temporary generation of electrical energy may be required.

The system comprises a plurality of mobile robots, which may be e.g. autonomous or remotely controlled. Since these robots are mobile, they may be e.g. stored in a parking area when no electrical energy is to be produced and moved on-demand to a target area when electrical energy is to be produced.

The mobile robots are mainly of two types:
a producing robot is used mainly to generate electrical energy; and
a collecting robot is used mainly to collect electrical energy generated by a plurality of producing robots coupled to said collecting robot, and to output it to an output port from which the electrical energy can be used by another equipment.

Typically, when required, at least one collecting robot and a plurality of producing robots travel to a target area. Once positioned in the target area, couplings are established between the mobile robots in order to form an array of coupled mobile robots, a "coupling" between two mobile robots enabling electrical energy transfer from one mobile robot to the other.

Figure 1:
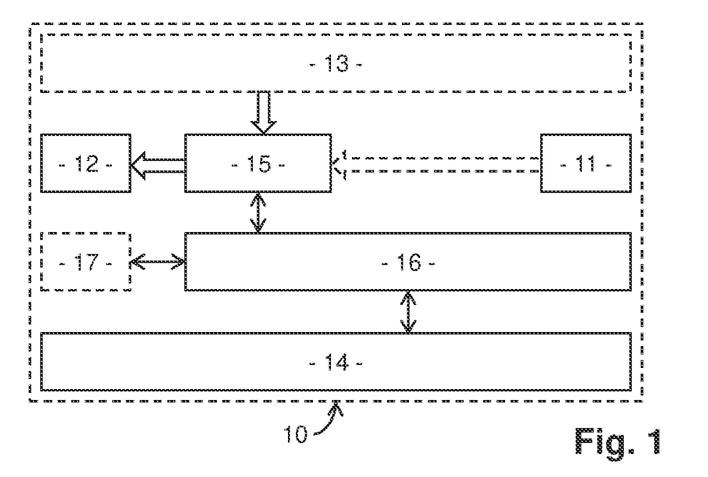
FIG. 1: a schematic representation of an exemplary embodiment of a collecting robot of a system for generating electrical energy.

FIG. 1 represents schematically an exemplary embodiment of a collecting robot 10. As can be seen in FIG. 1, the collecting robot 10 comprises displacement means 14 adapted to move the collecting robot 10 e.g. from a parking area to a target area. The displacement means 14 may be of any type known to the skilled person, and the movement of the collecting robot 10 may be terrestrial and/or aerial. For instance, the collecting robot 10 may be an unmanned terrestrial vehicle, UTV, and/or an unmanned aerial vehicle, UAV. Preferably, the displacement means 14 are electrical, and comprise e.g. one or more electrical motors for rotating wheels and/or propellers.

Also, the collecting robot 10 comprises at least one input port 11 adapted for coupling with a producing robot 20 for receiving electrical energy thereof. Preferably, the collecting robot 10 comprises a plurality of input ports 11 for e.g. coupling simultaneously with a plurality of producing robots 20 and/or for enabling different types of couplings with producing robots 20 (e.g. mechanical coupling, wireless coupling, etc.) and/or for increasing geometrical coupling flexibility by providing multiple different possible positions for a producing robot 20 to be coupled with the collecting robot 10.

The collecting robot 10 comprises also an output port 12 for outputting electrical energy received from each producing robot 20 coupled with the collecting robot 10. As discussed above, the purpose of the collecting robot 10 is mainly to centralize electrical energy received from a plurality of producing robots 20. Accordingly, the collecting robot 10 may comprise a single output port 12. However, the collecting robot 10 may also, in other examples, comprise a plurality of output ports 12 for supplying electrical energy to a plurality of equipment and/or for enabling different types of connections with the equipment that is to be supplied with electrical energy (e.g. mechanical connection, wireless connection, etc.). In preferred embodiments, the collecting robot 10 may be a tethered mobile robot in which the output port 12 is located at an end of a cable. Preferably, a tethered collecting robot 10 comprises a cable reel, for e.g. enabling storing the cable in a compact manner when not in use.

As discussed above, the purpose of the collecting robot 10 is mainly to centralize electrical energy received from a plurality of producing robots 20. Accordingly, the collecting robot 10 may be devoid of electrical energy generating means. However, in preferred embodiments, the collecting robot 10 may comprise also electrical generating means, at least for its own electrical energy consumption, and preferably for producing electrical energy to be outputted on its output port 12. In the preferred embodiment represented by FIG. 1, the collecting robot 10 comprises a photovoltaic, PV, generator 13. The PV generator 13 may comprise a rigid PV surface, a PV flexible surface, etc., or any combination thereof. In some embodiments, the PV surface of the PV generator 13 may foldable/un-foldable.

The PV surface of the PV generator 13 may be fixed with respect to a main body of the collecting robot 10.

However, in preferred embodiments, the collecting robot 10 may comprise means (not represented in the figures) for modifying the inclination of the PV surface with respect to the main body of the collecting robot 10. Such inclination modifying means may be any suitable means known to the skilled person and are preferably such they enable tilting the PV surface with respect to the main body with at least one degree of freedom, or preferably at least two degrees of freedom. For instance, modifying the inclination of the PV surface may be used to optimize the sunshine on the PV surface (e.g. by maintaining the PV surface substantially orthogonal to the sun rays) and/or in order to modify the shadowing made by the collecting robot 10, etc., without moving the collecting robot 10. For instance, the inclination modifying means may be controlled in order to modulate the shadowing made by the PV surface on e.g. crop below the collecting robot 10, while generating electrical energy. The inclination of the PV surface may also be dynamically adjusted as a compromise between electrical energy generation needs and shadow generation needs, or it is possible to define time intervals during which electrical energy generation is a priority and is to be maximized and other time intervals during which shadow generation is a priority and is to be optimized (maximized or minimized), etc.

As illustrated by FIG. 1, the collecting robot 10 comprises an electrical energy collector module 15 configured to collect the electrical energy received on any input port 11 (directly or via the PV generator 13, see FIG. 4) and to provide the electrical energy collected on the output port 12. If the collecting robot 10 comprises also electrical energy generating means, such as a PV generator 13, then the electrical energy collector module 15 is preferably also configured to collect the electrical energy generated locally by the collecting robot 10. In preferred embodiments, the electrical energy collector module 15 may comprise an electrical energy storage module (not represented in the figures), i.e. an electrical energy accumulator, for storing collected electrical energy. For instance, electrical energy may be stored if the level of electrical energy collected is higher than the level of electrical energy needed by any separate equipment connected to the output port 12 of the collecting robot 10. The electrical energy stored may be recovered and outputted on the output port 12 when e.g. the level of electrical energy collected in real-time becomes lower than the level of electrical energy needed (e.g. when the sun is temporally hidden by clouds, when inclination modifying means are used to optimize shadow generation, etc.).

As represented by FIG. 1, the collecting robot 10 comprises also a control module 16 for controlling the displacement means 14, and more generally for controlling the collecting robot 10. For example, the control module 16 comprises one or more processors and storage means (any type of computer readable storage medium) in which a computer program product is stored, in the form of a set of program-code instructions to be executed in order to control the collecting robot 10. Alternatively, or in combination thereof, the control module 16 can comprise one or more programmable logic circuits (FPGA, PLD, etc.), and/or one or more specialized integrated circuits (ASIC), etc., adapted for controlling the collecting robot 10. In other words, the control module 16 comprises a set of means configured by software (specific computer program product) and/or by hardware (processor, FPGA, PLD, ASIC, etc.) for controlling the collecting robot 10.

In preferred embodiments, and as illustrated by FIG. 1, the collecting robot 10 may comprise a communication module 17, for communicating data with other devices. Preferably, the communication module 17 is configured to exchange data according to at least one wireless communication protocol (WiFi®, Bluetooth®, 4G, 5G, etc. or any proprietary wireless communication protocol). In addition, or alternatively, the communication module 17 may be configured to exchange data according to at least one wired communication protocol. For instance, the communication module 17 may be used to receive data representative of an array configuration, such as a target position where the collecting robot 10 has to move, and any information necessary for enabling the collecting robot 10 to move to the target area. In case the collecting robot 10 moves in an autonomous manner to the target area, this data may be received before departing to the target area. If the collecting robot 10 is remotely control during its journey to the target area, this data may be continuously received during the journey, until the collecting robot 10 reaches the target area, etc.

In preferred embodiments, the collecting robot 10 may also comprise one or more sensors (not represented in the figures). For instance, the collecting robot 10 may comprise one or more navigation sensors (e.g. GPS sensor, etc.) for enabling the collecting robot 10 to reach the target area, one or more imaging sensors (e.g. camera, etc.) for e.g. acquiring information on the configuration of the target area, etc.

Figure 2:
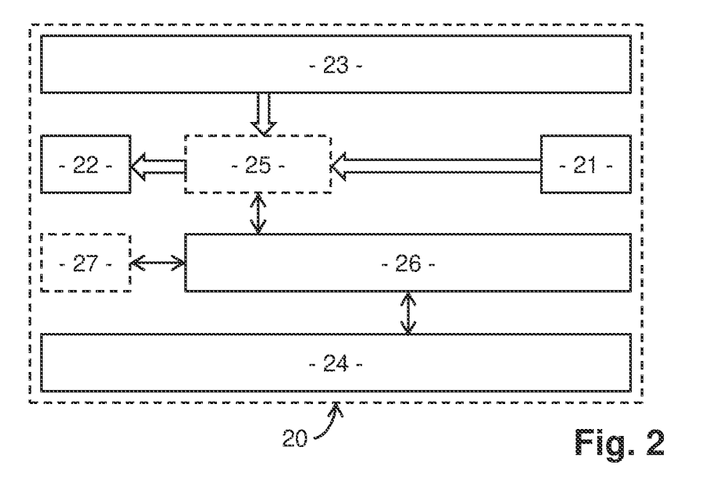
FIG. 2: a schematic representation of an exemplary embodiment of a producing robot of a system for generating electrical energy.

FIG. 2 represents schematically an exemplary embodiment of a producing robot 20. As can be seen in FIG. 2, the producing robot 20 comprises displacement means 24 adapted to move the producing robot e.g. from a parking area to a target area. The displacement means 24 may be of any type known to the skilled person, as discussed above for the collecting robot 10. For instance, the producing robot 20 may be an UTV and/or an UAV.

As discussed above, the purpose of a producing robot 20 is mainly to generate electrical energy. Accordingly, the producing robot 20 comprises electrical energy generating means, preferably a PV generator 23. The PV generator 23 of a producing robot 20 may have the same properties as those discussed above for the collecting robot 10. Also, in preferred embodiments, the producing robot 20 may also comprise means (not represented in the figures) for modifying the inclination of the PV surface with respect to a main body of the producing robot 20, as discussed for the collecting robot 10.

Also, the producing robot 20 comprises at least one input port 21 adapted for coupling with another producing robot 20, for receiving electrical energy thereof. Preferably, the producing robot 20 comprises a plurality of input ports 21 for e.g. coupling simultaneously with a plurality of producing robots and/or for enabling different types of couplings with producing robots 20, and/or for increasing geometrical coupling flexibility by providing multiple different possible positions in which two mobile robots can be coupled together.

The producing robot 20 comprises also at least one output port 22 for outputting electrical energy generated by the PV generator 23 of the producing robot 20 and electrical energy received from each other producing robot 20 it is coupled with. Preferably, the producing robot 20 comprises a plurality of output ports 22 for coupling simultaneously with a plurality of producing robots 20 and/or collecting robots 10 and/or for enabling different types of couplings, and/or for increasing geometrical coupling flexibility by providing multiple different possible positions in which two mobile robots can be coupled together.

As represented by FIG. 2, the collecting robot 10 comprises also a control module 26 for controlling the displacement means 24, and more generally for controlling the producing robot 20. The control module 26 of a producing robot 20 may have the same properties as those discussed above for the collecting robot 10.

In preferred embodiments, and as illustrated by FIG. 2, the producing robot 20 may comprise a communication module 27, for communicating data with other devices. The communication module 27 of a producing robot 20 may have the same properties as those discussed above for the collecting robot 10.

In some embodiments, and as illustrated by FIG. 2, the producing robot 20 may comprise an electrical energy collector module 25 configured to collect the electrical energy received on any input port 21 and generated by its own PV generator 23, and to provide the electrical energy collected on at least one output port 22. When present, the electrical energy collector module 25 of a producing robot 20 may have the same properties as those discussed above for the collecting robot 10. When present, the electrical energy collector module 25 may also comprise, in preferred embodiments, an electrical energy storage module (not represented in the figures) for storing collected electrical energy. However, it is emphasized that, in some embodiments, the producing robot 20 may be devoid of such an electrical energy collector module 25, for instance in the case discussed below where PV cells of different producing robots 20 are connected, thereby forming a macro PV generator grouping the PV generators of such producing robots 20.

In preferred embodiments, the producing robot 20 may also comprise one or more sensors (not represented in the figures), which may have the same properties as those discussed above for the collecting robot 10.

A indicated above, an output port 22 of a producing robot 20 may be coupled with an input port 21 of another producing robot 20 or with an input port 11 of a collecting robot 10. Typically, the couplings between the mobile robots will be established once the mobile robots have reached the target area, and according to a predetermined array configuration. The coupling between an output port 22 of a producing robot 20 with an input port 21 of another producing robot 20 or with an input port 11 of a collecting robot 10 may be established manually by a human operator or, preferably, automatically by said mobile robots. In the latter case at least, the mobile robots can control their relative positions and orientations to enable the coupling to be established.

The coupling may be wireless, using preferably near-field wireless power transfer technologies such as inductive coupling or capacitive coupling.

Preferably, the coupling is mechanical and may use any suitable electrical connectors to establish an electrical contact between an output port 22 and an input port 11, 21. Preferably, the electrical connectors are configured to allow the electrical contact to be established even in case of a slight misalignment between them. Also, the electrical connectors are preferably provided with means which force the electrical contact to be maintained between the output port 22 and the input port 11, 21. Such means may be for instance elastic means, such as a spring, and/or magnetic means such as an electro-magnet, etc.

According to a first non-limitative example, the electrical connectors used for establishing an electrical contact between an output port 22 and an input port 11, 21 may comprise a pair of male/female connectors. For instance, the female connector may be a rigid metal part having a predetermined opening width, while the male connector may be an elastic metal part, such as a folded metal plate, extending between a proximal end and a distal end. The distal end has a width lower than the opening width and the proximal end has a width higher than the opening width. Hence, when the male connector is inserted into the female connector, the proximal end of the male connector is compressed inside the female connector thereby establishing the electrical contact between the female connector and the male connector. According to a second non-limitative example, the electrical connectors may comprise a metal grid or plate, for instance at an input port 11, 21, and an elastic metal finger that may flex when in contact with the metal grid or plate.

In preferred embodiments, which enable a more precise positioning of the output port 22 with respect to the input port 11, 21, said output port 22 and/or said input port 11, 21 may be carried by a robotic arm (not represented in the figures). For instance, the robotic arm may be controlled autonomously by the mobile robot 10, 20 that carries said robotic arm, or it may be remotely controlled by a human operator.

More generally speaking, any type of electrical connectors enabling an electric contact to be established between an output port 22 and an input port 11, 21 of different mobile robots may be used in the present disclosure, and the choice of a specific type of electrical connectors corresponds to a specific embodiment of the present disclosure.

Figure 3:
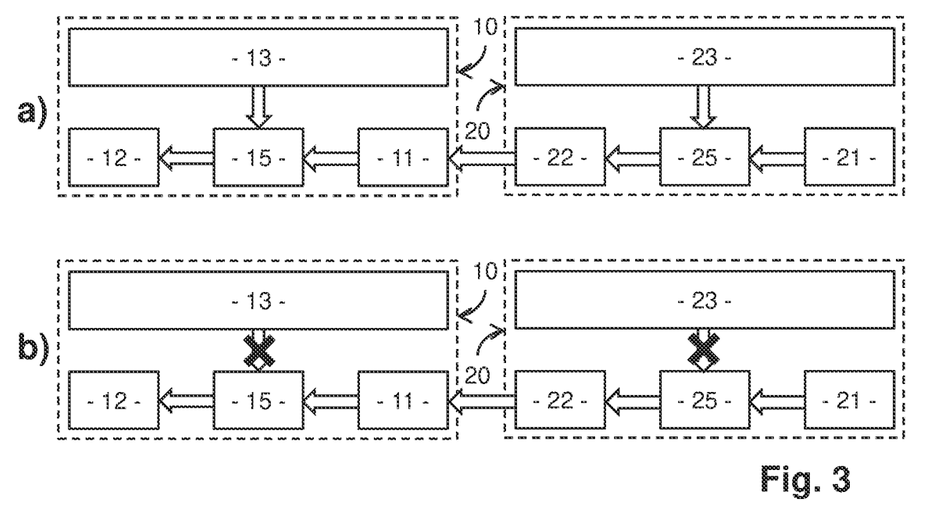
FIGS. 3 and 4: schematic representations of examples of different couplings between a collecting robot and a producing robot.
Figure 4:
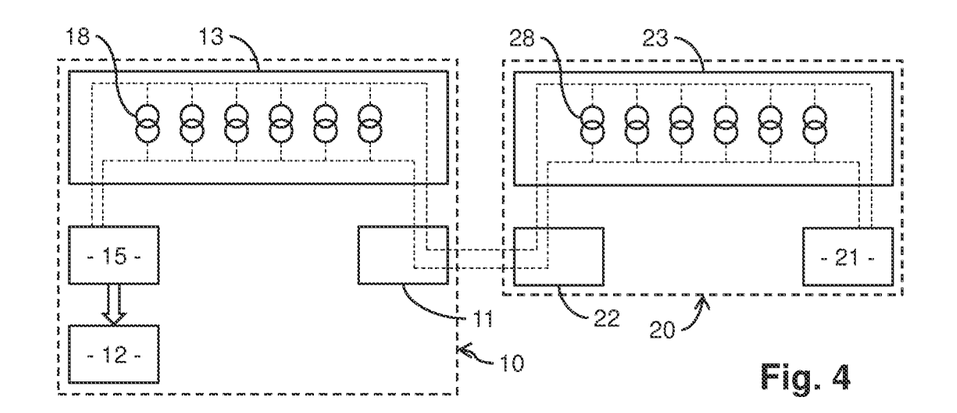

FIGS. 3 and 4 represent schematically two different examples of coupling between a producing robot 20 and a collecting robot 10 comprising a PV generator 13. It is emphasized that the examples represented in FIGS. 3 and 4 may also apply to the coupling between producing robots 20.

In the example represented by FIG. 3, both the collecting robot 10 and the producing robot 20 comprise an electrical energy collector module 15, 25. In this example, the producing robot 20 collects locally the electrical energy generated by its own PV generator 23, and possibly electrical energy received from another producing robot 20 it is coupled with. Both the PV generator 23 and the input port 21 of the producing robot 20 are connected to the electrical energy collector module 25. The output of the electrical energy collector module 25 is connected to the output port 22 of the producing robot 20.

The output port 22 of the producing robot 20 is coupled with the input port 11 of the collecting robot 10. As can be seen in FIG. 3, the electrical energy collector module 15 of the collecting robot 10 is connected to both the PV generator 13 and any input port 11 of the collecting robot 10. The output of the electrical energy collector module 15 is connected to the output port 12 of the collecting robot 10.

In part a) of FIG. 3, the sunlight conditions are such that the PV generators 13, 23 generate electrical energy. In part b) of FIG. 3, the sunlight conditions are such that the PV generators 13, 23 do not generate electrical energy anymore (e.g. cloudy weather, night, etc.). However, in this example, the electrical energy collector modules 15, 25 comprise respective electrical energy storage modules, from which previously stored electrical energy may be retrieved and outputted on the output ports 12, 22.

In the example represented by FIG. 4, the producing robot 20 does not comprise an electrical energy collector module 25. FIG. 4 represents schematically PV cells 28, 18 of the PV generators 23, 13 of the producing robot 20 and of the collecting robot 10. As can be seen in FIG. 4, the PV cells 28 of the producing robot 20 are connected to the output port 22 of said producing robot 20, and the PV cells 18 of the collecting robot 10 are connected to input port 11 of said collecting robot 10. Hence, when the coupling is established, the PV cells 28 of the producing robot 20 are connected electrically with the PV cells 18 of the collecting robot 10, thereby forming a macro PV generator composed by the PV generator 13 of the collecting robot 10 and the PV generator 23 of the producing robot 20 (and possibly other PV generators 23 of other producing robots 20). The electrical energy generated by the macro PV generator is collected directly by the electrical energy collector module 15 of the collecting robot 10. By forming such a macro PV generator grouping the PV generators of the coupled producing robots, the electrical energy transfer losses from each producing robot 20 to the collecting robot 10 are minimized. Also, the photovoltaic electrical energy generation is more efficient when connecting together an increased number of PV cells 18, 28.

Preferably, the PV surfaces of the PV generators 13, 23 have substantially the same shape. For instance, the PV surfaces of the PV generators 13, 23 have a polygonal shape, such as a triangular, square or, preferably, hexagonal shape. In such a case, input ports 11, 21 and output ports 12 may be arranged at sides of the polygonal shape. Several input ports 11, 21 and several output ports 22 may be arranged on different sides of the polygonal shape. Preferably, the PV surface of the PV generators 13, 23 define the maximal horizontal dimensions of each mobile robot equipped with a PV generator 13, 23, in order to facilitate the coupling between output ports 22 and input ports 11, 21 of different mobile robots.

Figure 5:
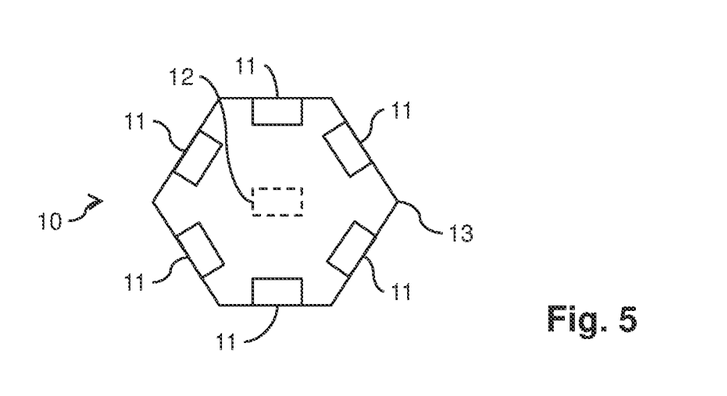
FIGS. 5 and 6: schematic top-view representations of exemplary embodiments of a collecting robot and a producing robot.

FIG. 5 represents schematically a top view of a collecting robot 10 comprising a PV generator 13 having a hexagonal PV surface. In the example of FIG. 5, the PV generator 13 comprises an input port 11 at each side of the hexagonal PV surface, such that up to six producing robots 20 can be directly coupled with the collecting robot 10. The input ports 11 are preferably at the sides of the PV surface, but other arrangements are also possible for the input ports 11 which are not necessarily arranged at the sides of the PV surface. The output port 12 is preferably not located on a side of the hexagonal PV surface. If the PV surface is arranged in an upper part of the collecting robot 10, the output port 12 may be for instance arranged in a lower part of said collecting robot 10. It is emphasized that, while the collecting robot 10 comprises preferably one input port 11 per side of the PV surface, it is also possible to have e.g. fewer input ports 11.

Figure 6:
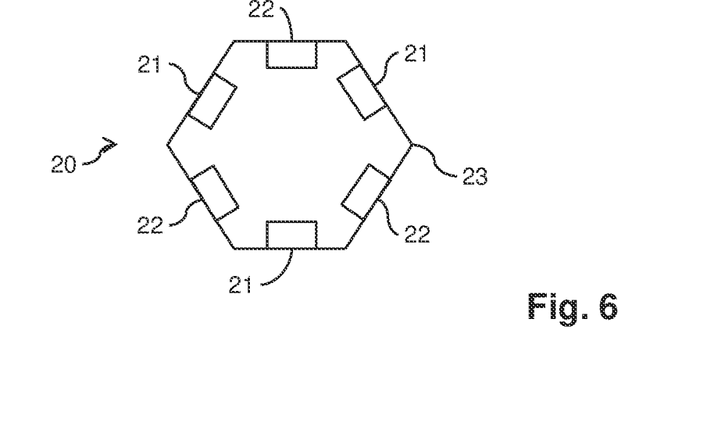

FIG. 6 represents schematically a top view of a producing robot 20 comprising a PV generator 23 having a hexagonal PV surface. In the example of FIG. 6, the PV generator 23 comprises three input ports 21 and three output ports 22 arranged on opposite sides of the hexagonal PV surface. Preferably, all input ports 21 and output ports 22 of the PV generator 23 are arranged at sides of the PV surface. However, other arrangements are possible for the input ports 21 and/or the output ports 22, which are not necessarily arranged at the sides of the PV surface. It is emphasized that the producing robot 20 may comprise more input ports 21 and/or output ports 22. For instance, each side of the PV surface may comprise both an input port 21 and an output port 22. Although the input port 21 and the output port 22 of a same side may not be used simultaneously, this provides for increased geometrical coupling flexibility since each side of the PV generator 23 can be used as an input port 21 or as an output port 22. In other examples, the producing robot 20 may also comprise fewer input ports 21 and output ports 22 and may comprise a single input port 21 and a single output port 22 arranged on different sides of the PV surface.

Figure 7:
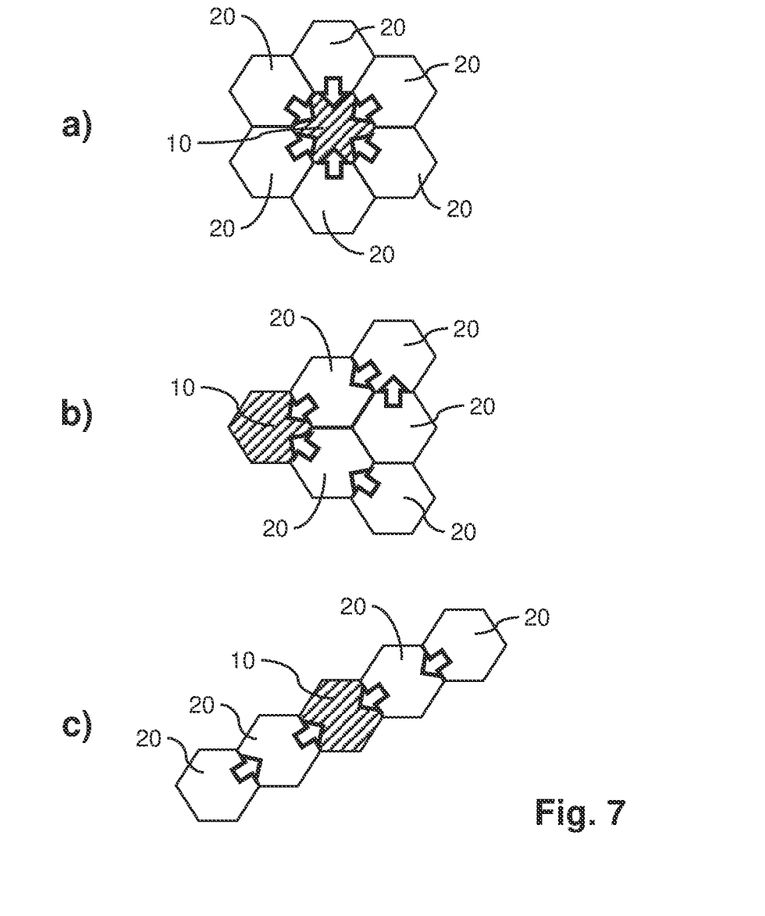
FIG. 7: schematic top-view representations of examples of arrays of coupled mobile robots.

By using PV surfaces of polygonal shape, the mobile robots can be coupled in a variety of ways, thereby enabling to compose arrays of coupled mobile robots having different shapes. FIG. 7 represents schematically examples of possible shapes for an array of coupled mobile robots having hexagonal PV surfaces. In FIG. 7, the couplings established are represented by arrows. For instance, part a) of FIG. 7 represents a first example of an array having a hexagonal shape, in which the collecting robot 10 is positioned at the center of the array and has a producing robot 20 on each side of its PV surface. Part b) of FIG. 7 represents a second example of an array having a triangular shape, in which the collecting robot 10 is positioned at a corner and has a two producing robots 20 on two adjacent sides of its PV surface. The array comprises also three additional producing robots 20 that are coupled indirectly with the collecting robot 10. Part c) of FIG. 7 represents a third example of an array having a linear shape, in which the collecting robot 10 is positioned at the center of the array has a two producing robots 20 on two opposed sides of its PV surface. The array comprises also two additional producing robots 20 that are coupled indirectly with the collecting robot 10.

It is emphasized that the embodiments described in reference with FIGS. 5 to 7 are possible for both configurations described in reference with FIG. 3 (each producing robot 20 has an electrical energy collector module 25) and FIG. 4 (macro PV generator).

Figure 8:
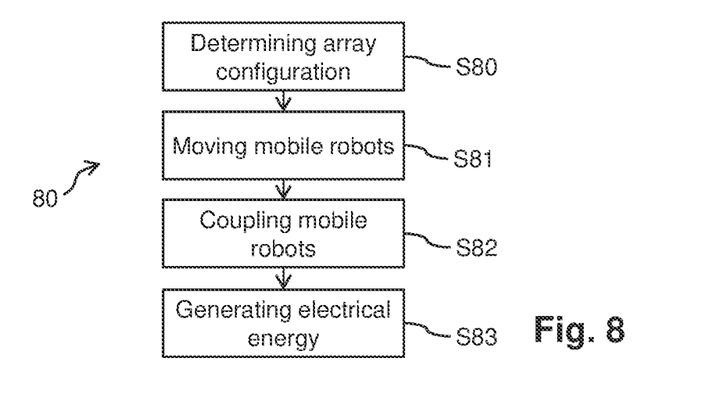
FIG. 8: a diagram representing the main steps of an exemplary embodiment of a method for generating electrical energy.

FIG. 8 represents schematically the main steps of an exemplary embodiment of a method 80 for generating electric energy using a system comprising at least one collecting robot 10 and a plurality of producing robots 20. As can be seen in FIG. 8, the method 80 comprises:
- a step S80 of determining a configuration of an array of coupled mobile robots comprising at least one collecting robot 10 and a plurality of producing robots, said array configuration defined by a number of mobile robots of the array, respective target positions and target orientations of the mobile robots of the array, and couplings to be established between mobile robots;
- a step S81 of commanding the uncoupled mobile robots to move from their respective current positions to their respective target positions and target orientations of the array configuration;
- a step S82 of coupling the input ports 11, 21 and output ports 22, of the mobile robots of the array according to the couplings defined in the array configuration;
- a step S83 of generating electrical energy by the array of coupled mobile robots and outputting generated electrical energy at the output port 12 of the collecting robot 10.

Hence, during step S80, the configuration of the array to be formed at the target area is determined. The determination of the array configuration aims at defining an array that will both:
- meet the electric energy generation needs at the target area; and
- comply with the configuration of the target area configuration.

For instance, the electrical needs are defined as a predetermined target level of electrical energy required and determining an array configuration comprises estimating the level of electrical energy generated by a candidate array configuration and comparing the estimated electrical energy level with the target electrical energy level.

In order to estimate the electrical energy level generated by a candidate array configuration, it is possible to estimate the electrical energy level generated by each PV generator 13, 23 of the candidate array configuration and the electrical energy losses from each PV generator 13, 23 to the output port 12 of the collecting robot 10.

Additionally, or alternatively, the array configuration may be determined based on a predetermined configuration of the target area. Indeed, the target area configuration may set some constraints on the configuration of the array. For instance, the expected weather at the target area will have an impact on the level of electrical energy that can be generated by the array of coupled mobile robots. Hence, the target area configuration may include weather information which includes information on the expected sunshine, at the target area, during one or more scheduled time intervals during which the array of coupled mobile robots is to be formed. Such information on the expected sunshine may be global (i.e. whether clouds are present) and/or local (i.e. whether there are obstacles such as trees and/or buildings that might cast shadows on the array despite the absence of clouds).

According to another example, the target area configuration may include information on the size and/or shape of the target area where the array of coupled mobile robots is to be stationed, and/or the position of the target area. Such information on the target area may be obtained from data acquired by one or more sensors of one or more mobile robots. For instance, a mobile robot may acquire beforehand images of the target area, which images may be used to determine the size and shape of the target area. The position of the mobile robot, for instance measured by a GPS sensor of said mobile robot, may also be used to determine the position of the target area.

According to another example, the target area configuration may include information of the position of at least one extraction point, to which the output of the collecting robot 10 needs to be connected. In other words, the extraction point is the separate equipment that will use and/or store the electrical energy generated by the array of coupled mobile robots. In particular, the position of the extraction point (i.e. the position in the target area of the equipment that is to be supplied with electrical energy) might set constraints on the position of the collecting robot 10 within the array of coupled mobile robots.

According to another example, the target area configuration may include information on the scheduled time interval(s) during which the array of coupled mobile robots is to be formed. The scheduled time interval(s) depend on when the electrical energy needs to be generated. However, the scheduled time interval(s) may also depend on the availability of the target area. For instance, there might be time intervals during which the mobile robots cannot station in the target area (e.g. in order let other vehicles access the target area), such that the array may need to be temporarily un-formed (by uncoupling the mobile robots), before being re-formed (by re-coupling the mobile robots). According to another example, there might be time intervals during which the mobile robots may have other tasks to accomplish. For instance, the mobile robots may also be used for temporarily shadowing an area, for instance for protecting crop from the sun when the sunlight is maximum, from heavy rain, from hail, from snow, etc. In that case, it is possible to move all or part of the mobile robots of the array above the area that needs to be shaded. The mobile robots used for shadowing may remain coupled together when moved above the area that is to be shaded, or, alternately, the array may be temporarily un-formed (by uncoupling the mobile robots) for shadowing the crop, before being re-formed (by re-coupling the mobile robots) when shadowing is no longer required.

Figure 9:
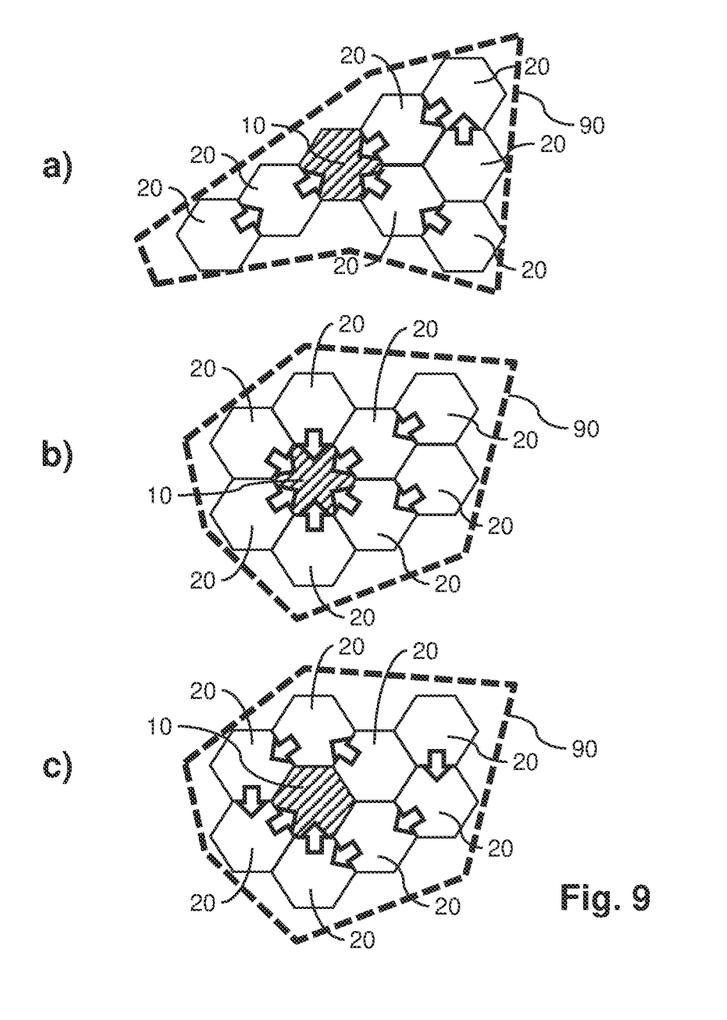
FIG. 9: schematic top-view representations of examples of arrays of coupled mobile robots in target areas.

FIG. 9 represents schematically examples of target areas 90, and corresponding examples of possible array configurations. The couplings between mobile robots are represented by arrows. More specifically, part a) and part b) of FIG. 9 represent target areas 90 with different shapes and possible arrays of coupled mobile robots. It is emphasized that the array configuration is defined by e.g. the respective target positions of the collecting robot 10 and producing robots 20, the respective target orientations of the collecting robot 10 and producing robots 20 (to enable the effective coupling between output ports 22 and input ports 11, 21) and the couplings to be established between output ports 22 and input ports 11, 21. Part c) of FIG. 9 represents an array which has the same number of mobile robots with the same target positions/target orientations as in the array represented in part b), but which uses different couplings between the mobile robots. For instance, in part b) of FIG. 9, most of the producing robots 20 are coupled directly with the collecting robot 10 and arranged in parallel. In part c) of FIG. 9, only two producing robots 20 are coupled directly with the collecting robot 10, and the array comprises two chains having each four producing robots 20 arranged in series. The choice of the couplings to be established might depend on the maximum electrical energy than can pass through a producing robot 20, on whether high voltage or high current generation is required, on the type(s) of couplings to be established (e.g. configuration of FIG. 3 or FIG. 4), etc.

For example, we can assume that the system for generating electrical energy comprises a total of $N_{PR}$ producing robots 20 and $M_{CR}$ collecting robots 10, each collecting robot 10 having a PV generator 13. For a given candidate array configuration comprising N producing robots 20 selected among the $N_{PR}$ producing robots 20 and one collecting robot 10 selected among the $M_{CR}$ collecting robots (i.e. a candidate array configuration comprising (N+1) mobile robots), then the estimated level of electrical energy provided at the output port 12 of the collecting robot 10 is for instance given by:

$$\sum_{i=1}^{N} \left(E_{PR}^{i} - L_{PR}^{i,j}\right) + \left(E_{CR}^{j} - L_{CR}^{j}\right) \quad (1)$$

expression in which:
   i is the index of a selected producing robot 20, 1≤i≤N;
   j is the index of the selected collecting robot 10;
   $E_{PR}^{i}$ is the estimated level of electrical energy generated by the PV generator 23 of the producing robot 20 of index i;
   $E_{CR}^{j}$ is the estimated level of electrical energy generated by the PV generator 13 of the selected collecting robot 10 of index j;
   $L_{PR}^{i,j}$ are the estimated electrical energy losses from the PV generator 23 of the producing robot 20 of index i to the output port 12 of the selected collecting robot 10 of index j;
   $L_{CR}^{j}$ are the estimated electrical energy losses from the PV generator 13 of the selected collecting robot 10 of index j to its own output port 12.

$E_{PR}^{i}$ and $E_{CR}^{i}$ may for instance be estimated based on an information on the weather expected at the target area. $L_{PR}^{i,j}$ depends e.g. on the couplings of the candidate array configuration. For instance, the electrical energy losses will be higher for a producing robot 20 that is coupled indirectly with the collecting robot 10 than for a producing robot 20 that is coupled directly.

If we denote by $W_{TARGET,j}$ the target electrical energy level at the output port 12 of the selected collecting robot 10 of index j, at the target area, then the candidate array configuration may be selected if e.g. the following condition, among others, is satisfied:

$$\sum_{i=1}^{N}\left(E_{PR}^{i}-L_{PR}^{i,j}\right)+\left(E_{CR}^{j}-L_{CR}^{j}\right)\geq W_{TARGET,j} \qquad (2)$$

If we denote by $S_{TARGET}$ the size, in square meters (m²), of the target area, and by $S_{PR}^{i}$ and $S_{CR}^{j}$ the sizes, in m², of the projected footprints of respectively the producing robot 20 of index i and the selected collecting robot 10 of index j, then a condition with respect to target area that the candidate array configuration may have to satisfy is the following:

$$\sum_{i=1}^{N}S_{PR}^{i}+S_{CR}^{i}\leq S_{TARGET} \qquad (3)$$

Of course, the shape of the target area may also be considered, in which case the shape of the projected footprint of the candidate array should preferably lie within the shape of the target area (as illustrated in FIG. 9).

It should be noted that it is also possible to determine two or more array configurations for the target area, leading to forming two or more arrays of coupled mobile robots in the target area.

For instance, it is possible to evaluate by simulation different possible candidate array configurations, and to select one or more array configurations that satisfy the constraints on e.g. the target electrical energy level, the target area configuration, etc.

In specific embodiments, the step S80 of determining the array configuration may comprise also determining an availability information for each mobile robot of the system and selecting the mobile robots of the array based on the availability information of each mobile robot.

For instance, a mobile robot may be considered available if it is not already used (or scheduled to be used) in another array formed in an area different from the present target area.

According to another example, a mobile robot may be considered available if it has an available level of electrical energy, stored e.g. in a battery of said mobile robot, that is enough to move said mobile robot from its current position, in a parking area, to a target position in the target area. For instance, if the available level of electrical energy of a mobile robot is denoted by $E_{AV}$ and if the estimated level of electrical energy required for moving the mobile robot from its current position to the target position is denoted by $E_{MOV}$, the mobile robot may be considered available if $E_{AV} \leq E_{MOV}$.

According to another example, a mobile robot may be considered available if it is expected to have, after having participated to the array in the target area, a level of electrical energy stored in its battery allowing it to return to the parking area. For instance, if we denote by $E_{STO}$ the estimated level of electrical energy that may be generated and stored in the battery of said mobile robot (and not transferred to the output port 12 of the collecting robot 10), while the mobile robot is stationed in the target area, then the mobile robot may be considered available if $E_{AV}-E_{MOV}+E_{STO} \geq E_{MOV}$.

The step S80 of determining the array configuration(s) is for instance implemented by an array controller (not represented in the figures).

For instance, the array controller comprises one or more processors and storage means (any type of computer readable storage medium) in which a computer program product is stored, in the form of a set of program-code instructions to be executed in order to determine array configurations. Alternatively, or in combination thereof, the array controller can comprise one or more programmable logic circuits, and/or one or more specialized integrated circuits, etc., adapted for determining in all or part array configurations. In other words, the array controller comprises a set of means configured by software and/or by hardware for determining array configurations.

For instance, the array controller may comprise or have access to a database storing information, referred to as "operational information", useful for determining the array configuration(s). Such operational information may include e.g. the target area configuration, estimated levels of electrical energy generated by each PV generator 13, 23 under different sunshine conditions, estimated electric energy losses within each mobile robot and at interfaces between mobile robots, the current positions of the mobile robots, the available electrical energy levels of the mobile robots, etc.

More generally, such a database may include one or more operational information among the following:
  target area configuration (e.g. weather information for each target area, size and shape of each target area, etc.);
  information on the mobile robots (e.g. number of collecting robots 10, number of producing robots 20, number of input ports and output ports of each mobile robot, estimated level of electrical energy generated for each mobile robot, availability information for each mobile robot, size and shape of PV surface of each mobile robot, available type(s) of couplings for each mobile robot, etc.);
  information on the farming operation schedules (for e.g. identifying where and when other vehicles may station or travel, etc.);
  crop rotation schedules (for e.g. identifying areas that need to be avoided when moving the mobile robots, etc.); etc.

The operational information in such a database may be gathered:
  manually (i.e. entered by a human operator); and/or
  automatically extracted from online sources (weather services, etc.); and/or
  automatically extracted from other databases of other similar systems for generating electrical energy; and/or
  obtained by measurements made by sensors of the mobile robots (for instance, one more mobile robots may be programmed to use onboard sensors to monitor each target area to collect relevant weather, ground surface and activity information, etc.), etc.

It is emphasized that the array controller may be external from the system for generating electrical energy. In that case, the system for generating electrical energy receives an array configuration from an external array controller. In other examples, the array controller may be internal to the system. In such a case, the array controller may be implemented in a device distinct from the mobile robots or, alternatively, may be implemented in a mobile robot, preferably in a collecting robot 10.

Once the array configuration is determined, each mobile robot that will be used for forming the array at the target area may be informed of all or part of the array configuration. For instance, each mobile robot may receive information on its own target position and target orientation, and on the couplings that are to be established with its adjacent mobile robots. Other information may also be received such as the scheduled time interval(s) for generating electrical energy, a sequence of movement (if the mobile robots do not move simultaneously to the target area), etc.

During step S81, the uncoupled mobile robots are commanded to move from their respective current positions to their respective target positions and target orientations of the array configuration.

During step S82, the input ports 11, 21 and output ports 12 of the mobile robots of the array are coupled according to the couplings defined in the array configuration.

During step S83, the array of coupled mobile robots generates electrical energy which is output at the output port 12 of the collecting robot 10.

It is emphasized that the steps S80, S81, S82 and S83 of the method 80 for generating electrical energy are not necessarily executed one after the other, as may suggest FIG. 9, and may for instance be executed in parallel.

For instance, it is possible to move first at least one mobile robot to the target area, for instance the collecting robot 10 (step S81 for the collecting robot 10). The collecting robot 10 may acquire data (e.g. images, etc.) that is used to determine the array configuration (step S80). Once the array configuration is determined, a first producing robot 20 may be moved to the target area (step S81 for the first producing robot 20) and coupled with the collecting robot 10 (step S82 for the first producing robot 20). Then a second producing robot 20 may be moved to the target area (step S81 for the second producing robot 20) and coupled (directly or indirectly) with the collecting robot 10 (step S82 for the second producing robot 20), etc., until all the producing robots 20 of the array have moved to the target area and coupled (directly or indirectly) with the collecting robot 10. Also, the generation of electrical energy (step S83) may start as soon as the collecting robot has reached its target position or, alternatively, may start only once some or all mobile robots of the array are coupled.

As discussed above, the mobile robots of the array may also be used to accomplish other tasks, such as shadowing temporarily an area in the vicinity of the target area where the temporary PV installation is formed, in order to e.g. protect said area from the sun, from heavy rain, from hail, from snow, etc. This may for instance be accomplished by moving all of part of the mobile robots of the array above the area to be shaded. Hence:
- during a first time interval, at least, the mobile robots are coupled to form the array and to generate electrical energy; and
- during a second time interval, at least: all or part of the mobile robots of the array are moved above the area to be shaded.

As discussed above, the shadowing may be accomplished while maintaining the mobile robots used coupled together or, alternatively, the mobile robots used for shadowing may be uncoupled beforehand and the uncoupled mobile robots may be moved above the area to be shaded.

If the mobile robots remain coupled together, then the generation of electrical energy may continue while shadowing the area to be shaded. In that case, using an untethered collecting robot 10 makes it easier to move the array while simultaneously transferring in an efficient manner the generated electrical energy to an extraction point. Also, if the mobile robots remain coupled together for shadowing, then the coupled mobile robots may be moved by using all the displacement means 14, 24 of the coupled mobile robots, or by using only some of the displacement means 14, 24 of the coupled mobile robots (i.e. the displacement means 14, 24 of some of the coupled mobile robots are not activated, e.g. to save electrical energy).

If the mobile robots are UAVs, then the mobile robots preferably fly over the area to be shaded.

If the mobile robots are UTVs, then each mobile robot used for shadowing is preferably configured such that there is room below its main body. For instance, the main body has a bottom face that is positioned (or that can be positioned if e.g. the main body is movable vertically) at a height with respect to the ground that is higher than or equal to 0.5 m, or preferably higher than or equal to 1 m.

As discussed above, the mobile robots may also be used for shadowing the target area where they are stationed for generating electrical energy. Preferably, the mobile robots are equipped with means for dynamically modifying the inclination of their PV surface, thereby dynamically adapting the shadow generation at the target area, while generating electrical energy.

It is emphasized that the present invention is not limited to the above exemplary embodiments. Variants of the above exemplary embodiments are also within the scope of the present invention.

For example, the invention has been described considering mainly an array comprising a single collecting robot 10. However, it is also possible, in other examples, to form an array of coupled mobile robots comprising a plurality of producing robots 20 and two or more collecting robots 10, for instance if two or more extraction points are required at the target area.

Also, it is possible to consider other environmental elements such as rain, hail, snow, etc. For example, inclination modifying means may be used to modify the inclinations of the PV surfaces of the mobile robots to provide a temporary protection against environmental hazards when the electrical energy stored by the mobile robots is sufficient for their own operations as well as for the delivery of electrical energy, etc.

The invention claimed is:

1. A system for generating electrical energy to be supplied to an equipment at a target area, for instance at an agricultural site, said system comprising:
   at least one mobile robot, referred to as "collecting robot";
   a plurality of mobile robots, referred to as "producing robots";
   wherein each collecting robot comprises:
      at least one input port adapted for coupling with an output port of a producing robot, for receiving electrical energy thereof;
      an output port for outputting electrical energy received from each producing robot coupled with the collecting robot;
   wherein each producing robot comprises:
      a photovoltaic, PV, generator for generating electrical energy;
      at least one input port adapted for coupling with an output port of another producing robot, for receiving electrical energy thereof;
      at least one output port for outputting electrical energy generated by the producing robot and received from each other producing robot coupled with the producing robot,
   wherein at least one collecting robot and a plurality of producing robots are coupled together at the target area and the output port of the at least one collecting robot is connected to the equipment, and the collecting robot is configured to collect electrical energy from all producing robots with which the collecting robot is coupled and to supply the equipment with the collected electrical energy at the target area.

2. The system according to claim 1, wherein each input port and each output port of a producing robot is connected to PV cells of the PV generator of said producing robot, such that the PV cells of coupled producing robots form a macro PV generator grouping the respective PV generators of the coupled producing robots.

3. The system according to claim 1, wherein the PV generator of a producing robot has a polygonal shape having at least three sides, and wherein at least one input port and at least one output port are located on different sides of the PV generator.

4. The system according to claim 1, wherein the PV generator of a producing robot has a triangular shape or a square shape or a hexagonal shape.

5. The system according to claim 1, wherein each producing robot comprises an electrical energy collector module configured to:
   collect the electrical energy generated locally by the PV generator and any electrical energy received on an input port; and
   provide the electrical energy collected on the output port.

6. The system according to claim 5, wherein at least one input port and at least one output port of all or part of the producing robots is a wireless power transfer module.

7. The system according to claim 1, wherein at least one collecting robot and/or at least one producing robot is an unmanned terrestrial vehicle, UTV.

8. The system according to claim 1, wherein at least one collecting robot and/or at least one producing robot is an unmanned aerial vehicle.

9. The system according to claim 1, wherein at least one collecting robot comprises a PV generator.

10. System according to claim 9, wherein the PV generator of a collecting robot has a triangular shape or a square shape or a hexagonal shape.

11. The system according to claim 1, wherein at least one mobile robot comprises means for modifying the inclination of a PV surface of a PV generator of said mobile robot with respect to a main body of said mobile robot.

12. The system according to claim 1, wherein at least one collecting robot is a tethered mobile robot in which the output port is located at an end of a cable.

13. The system according to claim 1, comprising an array controller configured to determine a configuration of an array of coupled mobile robots comprising at least one collecting robot and a plurality of producing robots.

14. A method for generating electrical energy to be supplied to an equipment at a target area, for instance at an agricultural site, by using a system comprising:
   at least one mobile robot, referred to as "collecting robot";
   a plurality of mobile robots, referred to as "producing robots";
wherein each collecting robot comprises:
   at least one input port adapted for coupling with an output port of a producing robot, for receiving electrical energy thereof;
   an output port for outputting electrical energy received from each producing robot coupled with the collecting robot;
wherein each producing robot comprises:
   a photovoltaic, PV, generator for generating electrical energy;
   at least one input port adapted for coupling with an output port of another producing robot, for receiving electrical energy thereof;
   at least one output port for outputting electrical energy generated by the producing robot and received from each other producing robot coupled with the producing robot;
wherein said method comprises:
   determining a configuration of an array of coupled mobile robots comprising at least one collecting robot and a plurality of producing robots, said array configuration defined by a number of mobile robots of the array, respective target positions and target orientations of the mobile robots of the array, and couplings to be established between input ports and output ports of the mobile robots of the array such that each producing robot is coupled directly or indirectly to the collecting robot;
   commanding the uncoupled mobile robots to move from their respective current positions to their respective target positions and target orientations of the array configuration;
   coupling the input ports and output ports of the mobile robots of the array according to the couplings defined in the array configuration; and
   generating electrical energy by the array of coupled mobile robots, collecting the electrical energy generated by the collecting robot and outputting the collected electrical energy at the output port of the collecting robot connected to the equipment.

15. The method according to claim 14, wherein the array configuration is determined based on a predetermined target level of electrical energy to be generated at the target area.

16. The method according to claim 14, wherein the array configuration is determined based on a configuration of the target area, said configuration of the target area comprising at least one of the following:
   position of the equipment to be connected to the output port of the collecting robot;
   information on a size and/or a shape of the target area where the array of coupled mobile robots is to be stationed;
   weather information for the target area;
   scheduled time interval during which the array of coupled mobile robots is to be formed.

17. The method according to claim 14, wherein determining the array configuration comprises determining an availability information for each mobile robot of the system and selecting the mobile robots of the array based on the availability information of each mobile robot.

18. A method for generating electrical energy and for shadowing an area, said method comprising:
   during a first time interval: generating electrical energy, by a method according to claim 14, by an array of coupled mobile robots; and
   during a second time interval: moving all or part of the mobile robots of the array above an area that is to be shaded.

* * * * *